United States Patent [19]

Boyer et al.

[11] Patent Number: 5,124,521
[45] Date of Patent: Jun. 23, 1992

[54] METHOD AND APPARATUS FOR CONTROLLING WELDING CURRENT IN RESISTANCE WELDING

[75] Inventors: Jean-Noel Boyer, Luceau; Henri Pellegrini, Chateau-Du-Loir, both of France

[73] Assignee: ARO S.A., Chateau-Du-Loir, France

[21] Appl. No.: 551,001

[22] Filed: Jul. 11, 1990

[30] Foreign Application Priority Data

Sep. 12, 1989 [DE] Fed. Rep. of Germany ....... 3930378

[51] Int. Cl.$^5$ ............................................. B23K 11/25
[52] U.S. Cl. ..................................... 219/110; 219/109
[58] Field of Search ................................. 219/110, 109

[56] References Cited

U.S. PATENT DOCUMENTS

| | | | |
|---|---|---|---|
| 4,516,008 | 5/1985 | Jones | 219/110 |
| 4,634,830 | 1/1987 | Furudate | |
| 4,795,877 | 1/1989 | Bridgstock et al. | 219/110 |
| 4,954,686 | 9/1990 | Izume | 219/110 |

OTHER PUBLICATIONS

Abstracts—vol. 6 #1 Jan. 7, 1989 56-126084.

Abstracts—vol. 13 #300 Jul. 11, 1989 1-91978.

Primary Examiner—Clifford C. Shaw
Attorney, Agent, or Firm—Antonelli, Terry Stout & Kraus

[57] ABSTRACT

For improving the quality of welding operations, in a process for alternating current welding, in which during a period the actual r.m.s., welding current is measured and the phase displacement of the use of current flow during the next period of the a.c. current is regulated. Variations of the actual r.m.s. welding current during all the welding periods already performed are taken into account and compared with a desired r.m.s. current during the welding period to be performed. A welding apparatus for alternating current welding using two welding electrodes, a power supply for the same and a device for regulating the r.m.s. welding current during each a.c. voltage period has a computer for taking into account variations of the actual r.m.s. welding current during preceding welding periods of a welding operation compared with a desired r.m.s. welding current flow during the further welding periods to be performed of the particular welding operation.

11 Claims, 3 Drawing Sheets

METHOD AND APPARATUS FOR CONTROLLING WELDING CURRENT IN RESISTANCE WELDING

FIELD OF THE INVENTION

The invention relates to an alternating current welding process, in which, during one period, the actual effective or r.m.s. welding current is measured and the phase displacement of the use of the current flow is regulated during the next a.c. voltage period, as well as to a welding apparatus for alternating current welding with two welding electrodes, a power supply for the same and a device for regulating the r.m.s. welding current during each a.c. voltage period.

BACKGROUND OF THE INVENTION

In resistance welding a considerable current flows through the superimposed plates or parts, which are compressed between two electrodes or tool parts. The contact resistance between the plates, generally made from steel, is considerable. The current flow brings about a heating, which once again leads to the formation of a core of melted metal from both plates, so that the desired connection is obtained on cooling. The energy required for forming the melting core is $rI^2t$, $r$; the sum of electrical resistances, $I = $ r.m.s. current and $t = $ the total current flow time.

In order to achieve high quality resistance welding, it is necessary to obtain a very specific product $rI^2t$. As the resistance, essentially determined by the contact resistances, is dependent on the parts to be connected or joined together, the basic parameters for the welding control or regulation are the welding time and intensity, i.e. the r.m.s. welding current.

Welding control systems with automatic welding time variation are known. However, the conditions for automatic production require minimum and, in particular, precise times for the working cycles, which requires forecastable welding times and therefore solutions with current control or regulation at preset time are preferred.

Known resistance welding machines have an electric primary supply with e.g. 220 or 380 V a.c. voltage. They are provided with a thyristor interrupter formed from two oppositely directed thyristors, whose control inputs are controlled by control electronics. The interrupter supplies the primary coil of a welding transformer, whose secondary coil, which generally supplies a voltage of 3 to 20 V, is connected to arms or welding machine electrodes fixed thereto. The current flows across the electrodes and thus brings about the welding of the plates located between the same. For this purpose the electrodes are pressed, generally pneumatically, on to the plates with a predetermined force, which is generally several hundred decaNewtons.

Two processes are known for controlling the welding current. Both processes make it possible to work with a predetermined constant welding time. In welding practice, the welding time is generally expressed as the number of periods or cycles of the electric current or voltage. For example, welding for ten periods at 50 Hz supply voltage corresponds to a welding time of 0.2 sec. In all known processes with thyristor control for regulating the current, the firing angle or phase of the thyristor is controlled.

A simple control of the welding current makes it possible to program the number of alternating current periods during which a flow of current through the weld point is allowed and a firing angle $\psi$ of the thyristor at each polarization change, which makes it possible to adjust the r.m.s. value of the welding intensity. Thus, thyristor firing takes place at an angle $\psi$ following the voltage zero passage and the current intensity only reaches zero at an angle $\phi$ following a further zero passage. The angle $\psi$ serves as a control value, whereas the angle $\phi$ is obtained on the basis of the reactance of the electric circuit of the machine.

This known current control by varying the firing angle of the thyristors controls the average current or r.m.s. current during a period, which is determinative for the welding.

This open system, without any measurement of the actual current flow and without regulation, does not guarantee a constant welding intensity either during spot welding, or from one spot weld to the next. Thus, there can be variations in the ratio $U/Z = I$ ($U = $ r.m.s. value, $I = $ r.m.s. current, $Z = $ impedance) due to fluctuations in the primary voltage or variations in the total impedance of the installation.

Therefore a process has already been proposed in which the welding current is regulated. For this purpose the r.m.s. welding intensity is measured during each period and compared with a desired value. From this comparison an analog or digital computer determines the desired thyristor firing angle for the next period, so that during the latter a welding intensity equal to the predetermined desired intensity is obtained. An apparatus for performing this process has a computer for determining the displacement or shift of the firing angle, as well as a coil and a following integrating unit for measuring the actual welding current. This process makes it possible to take account during the follow-up period $n+1$, voltage and impedance changes during a first welding period.

For example, during first welding period, the current can be much lower than the desired value, which is often the case at the start of new welding, because the system has no reference information for the angle $\psi$. The following periods can then be regulated in the described manner, so that, to the extent that, for example, the power supply remains constant, the actual current flowing corresponds to the desired value. However, if the voltage drops, for example, due to simultaneous welding of another machine connected to the same network, a lower current flow occurs and account is taken thereof in the further periods as a result of the regulation, so that during the same the current flow corresponds to the desired value. Thus, the average intensity occurring during welding even in the case of perfect operation of the regulation system is lower than the desired value, so that the weld point does not have the desired, intended characteristics.

SUMMARY OF THE INVENTION

The aim underlying the present invention essentially resides in providing a method and apparatus which ensures optimum quality welds.

According to the invention, in a process of the aforementioned type, divergences of the r.m.s. welding current during all the welding periods performed compared with a desired r.m.s. current is taken into account during the welding periods still to be carried out. For the apparatus solution of this problem, a computer is provided for taking into account variations of the r.m.s. welding current during preceding welding periods of a welding operation compared with a desired r.m.s. welding current flow during the further welding periods to be carried out.

The invention ensures that over an entire welding operation period, the flowing average r.m.s. current has the desired value. The essential difference between the invention and the known regulating system is that, in addition, at each time, the excess or deficiency of the welding intensity over all the welding periods carried out is determined and this excess or deficiency is distributed over the entire a.c. voltage periods to be carried out, so that the average r.m.s. current intensity which has flowed through the weld point corresponds to the desired value over the entire welding operation. Preferably, the variations are used for adapting the desired value for regulating the phase displacement. The desired value based on known regulating means, is adapted over the a.c. voltage periods carried out, while taking account the welding current which has already flowed and the variation is distributed over the periods still to be performed, so that finally the desired average r.m.s. current occurs.

According to a preferred development of the present invention excessive intensities or regulating variations are suppressed and, for example, the maximum current can be limited. The apparatus can have further alarm devices. When, as a result of excessive variations, for example, a brief voltage failure or the like, it is still possible with the inventive measures to achieve a weld of the desired quality, so that if at the end of a welding operation the variation of the actual average r.m.s. current and the desired value of the total r.m.s. current is excessive, an alarm signal is emitted and/or an alarm signal is immediately given in real time if it can be foreseen that a correction will not be sufficient to obtain the predetermined tolerances for the average r.m.s. welding current.

A time regulation can be combined with the inventive intensity regulation. For ensuring the desired welding quality of a weld spot, according to a preferred development of the invention in the case of serious problems the number of welding periods to be carried out during the a.c. voltage periods is modified. The average r.m.s. currents of each period is redefined in such a way that the total welding energy for a welding operation is also maintained during one of the number of welding periods. Thus, in this case, in auxiliary manner, use is made of a time regulation for increasing or decreasing the number of welding periods for a welding operation. According to a preferred development of the invention, the conditions of the generally automatic production cycles of the system are taken into account where the resistance welding apparatus is located. If for example, due to the safety mechanism of the production system in which the welding machine integrated, there is to be an extension of the welding time, one or more welding periods can be used for regulation purposes. This can e.g. occur in the case where a chance voltage change causes a significant current deficiency in the last only planned welding period, which cannot be compensated by current compensation. It is also desirable to limit the intensity variations from one period to the next, in that the time is extended in order to better distribute serious problems. In the case of such a time extension, by adding one or more welding periods, the adaptation processor redefines the desired value of the average r.m.s. current per period in such a way that the total product $rI^2t$ remains identical to that for the entire welding operation.

Obviously in the case where a major fault leads to a current excess at the start of the welding operation, the system can suppress one or more periods at the end of it, after the desired value of the average r.m.s. current per period has been recalculated so that the product $rI^2t$ corresponds to that for the entire welding operation.

BRIEF DESCRIPTION OF THE DRAWINGS

The invention is described in greater detail hereinafter relative to a non-limitative embodiment and the attached drawings, wherein.

DETAILED DESCRIPTION

Figure 1:
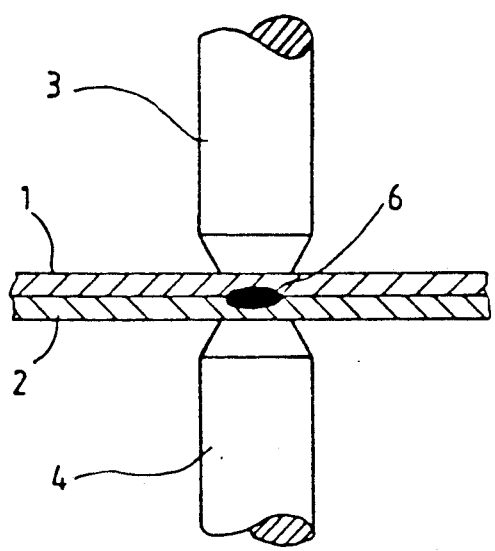
FIG. 1 is a schematic cross-sectional view of two metal plates to be welded together and placed between two electrodes.

FIG. 1 shows two metal plates 1,2 to be welded together by welding electrodes 3,4. It is clear that 6 is a weld point after the passage of the welding current located between the electrodes.

Figure 2:
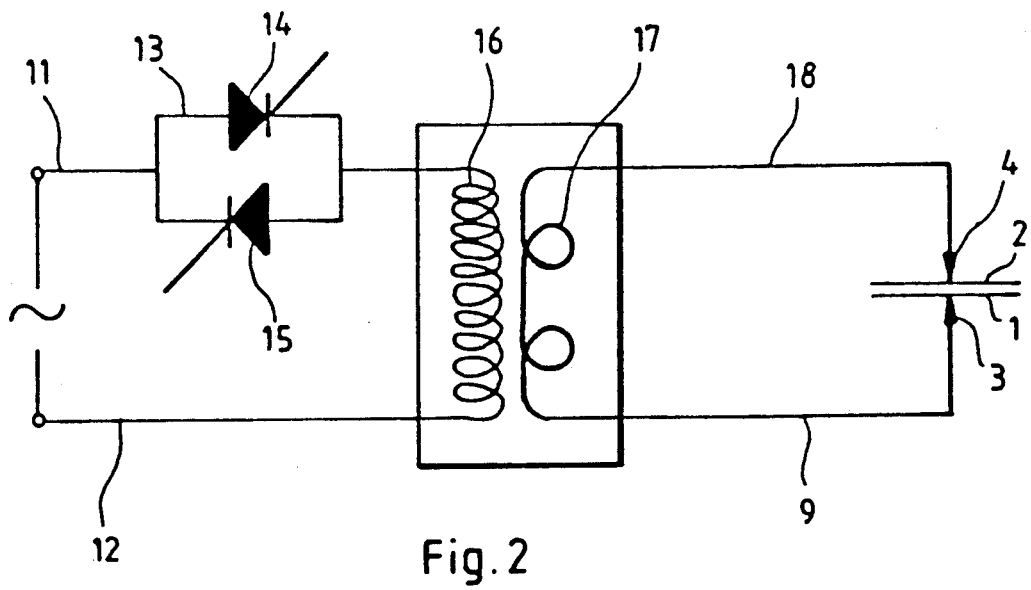
FIG. 2 is a schematic view of a resistance welding apparatus in accordance with the present invention.
Figure 5:
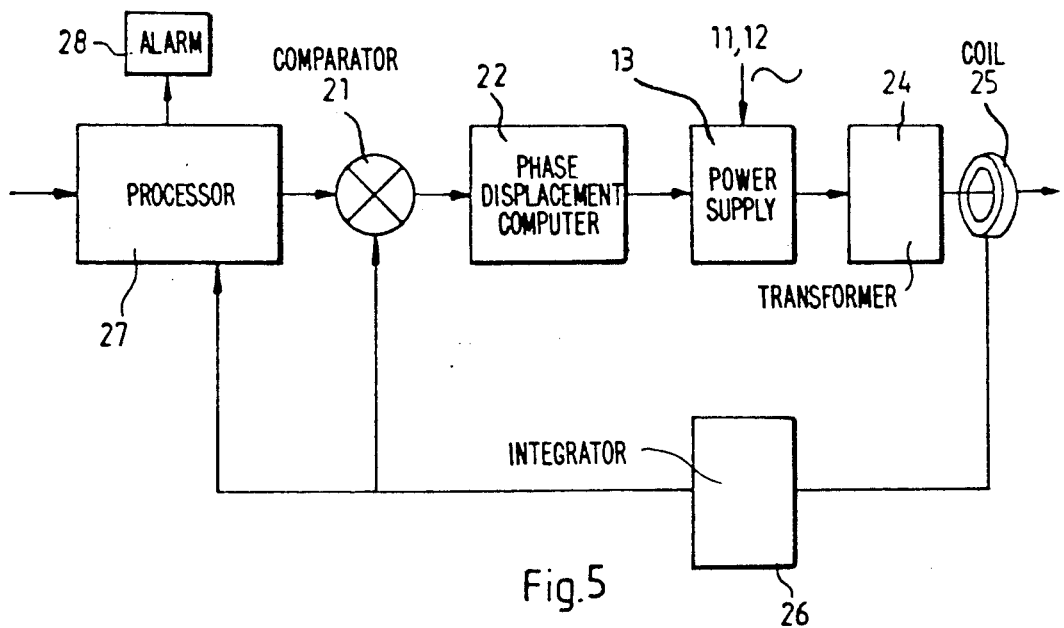
FIG. 5 is a block diagram of a circuit of the invention.

As shown in FIG. 2, the electric primary supply takes place across 11 and 12, e.g. with 220 or 380 V a.c. voltage. The thyristor interrupter 13 comprises two antiparallel thyristors 14 and 15. The control inputs of the thyristors 14 and 15 are controlled by the regulating electronics, as shown in FIG. 5. In place of two antiparallel thyristors, it would also be possible to use a triac. The interrupter 13 supplies the primary coil 16 of a welding transformer, whose secondary coil generally supplies a voltage of 3 to 20 V and is connected via arms 18,19 to the welding electrodes 3,4, which are carried by the arms 8,9. The welding current flows across electrodes 3,4 in order to bring about the welding of the welding plates 1,2. As stated hereinbefore for this purpose the electrodes are pressed pneumatically against the plates with a predetermined force of generally several hundred decaNewtons. The normally pneumatic pressing means do not form part of the invention and are not described in detail here.

Figure 3:
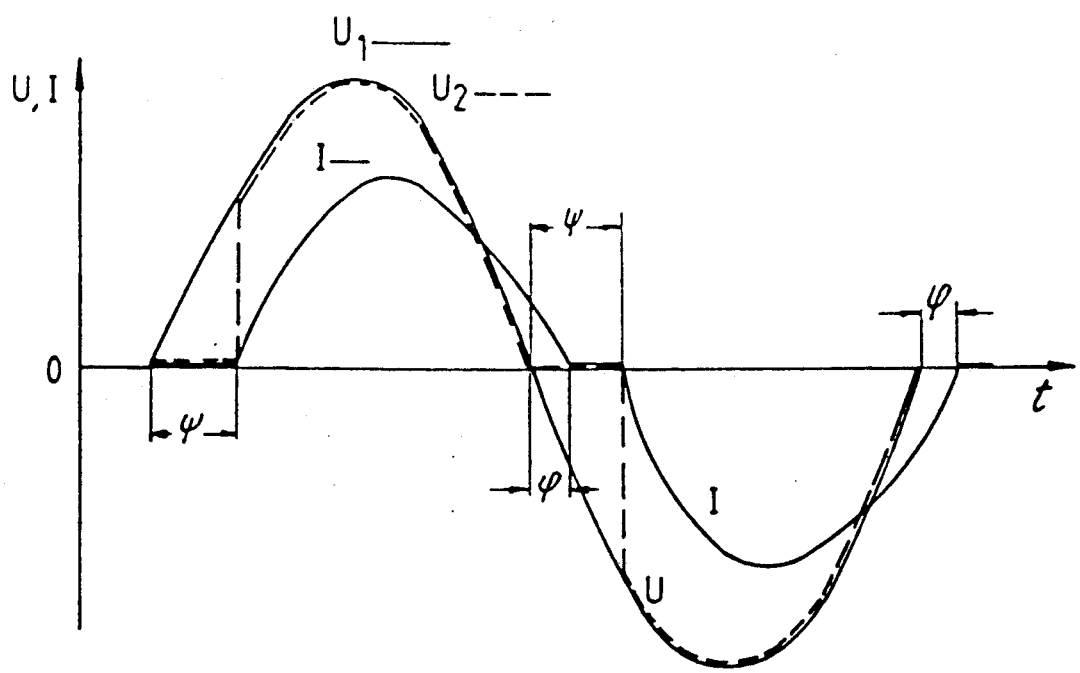
FIG. 3 is a graphical illustration of a phase path of current and voltage in a welding device regulating the r.m.s. current intensity forming a basis for the present invention.
Figure 4:
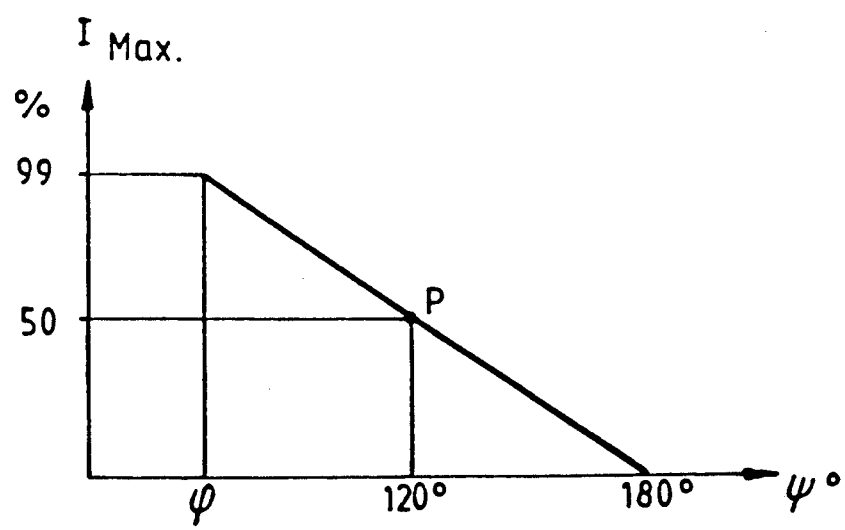
FIG. 4 is a graphical illustration of the change to r.m.s. current with the phase displacement of the current use.

FIG. 3 fundamentally shows the principle of the current control by means of thyristors. On the ordinate is plotted the voltage U and on the abscissa the instantaneous current I over the time t. The thyristors are fired by a phase or angular displacement $\psi$ following the voltage zero passage and the current intensity only reaches zero with a delay $\phi$ following the further voltage zero passage. The angle $\psi$ is determined by the control or regulating means, while the angle $\phi$ is merely a consequence of the reactance of the electric circuit of the machine. As a result of this current regulation by varying the thyristor firing angle, the average r.m.s. current is modified during a period, i.e. the current which is significant for the welding operation. In FIG.

4, the ordinate represents the desired welding intensity as a percent of the maximum intensity of the machine and which corresponds to the thyristor firing angle for obtaining this intensity and given on the abscissa.

FIG. 5 shows the diagram of the inventive regulating means and the adaptation of the current intensity. The apparatus has a comparator 21 for comparing the inventively adapted desired intensity $I_{ca}$ with the actual r.m.s. intensity of the current. There is also a phase displacement computer 22, which, as a result of the comparison carried out by the comparator 21, regulates the firing phase $\psi$ of the interrupter 13 across its controlling electrode (or that of the antiparallel thyristors 14,15—FIG. 2), so that in this way it is possible to regulate the current flow from the power supply 11,12 to the transformer 24 (with primary coil 16 and secondary coil 17—FIG. 2), so that the welding current $I_s$ is obtained at the weld point.

A toroidal coil 25 is provided there and brings about the measurement of the welding current by the following integrator 26 by integration of the modification of the current and whose output $I_m$ is compared in the comparator 21 with the adapted desired value $I_{ca}$. As a result the regulation of the welding current of the period n+1 is carried out on the basis of the measurement of the periods. In the prior art the desired value supplied to the comparator is constant, whereas, according to the invention it is varied and adapted.

Figure 6:
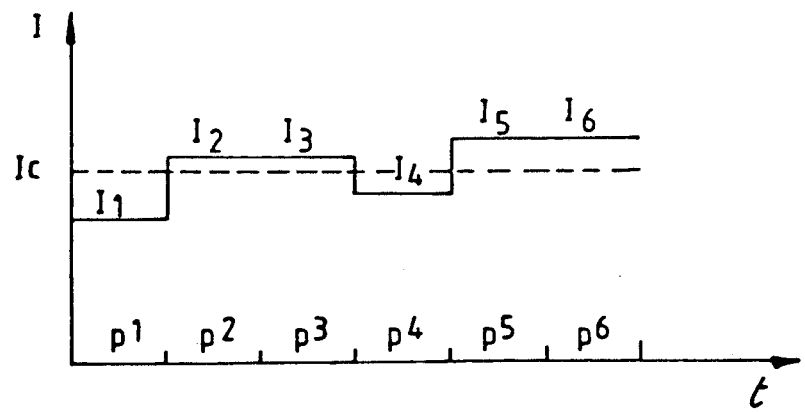
FIG. 6 is a graphical illustration of the r.m.s. current flow during a welding operation with six periods.

For this purpose the information of the actual current flow through the weld point delivered by coil 25 across the integrator 26 is supplied to an adaptation processor 27 positioned upstream of the comparator 21 and which on the basis of a fixed, predetermined desired value $I_c$ regulates the adapted desired value $I_{ca}$ on the basis of the actual current intensity of all the welding periods already carried out and the welding periods still to be carried out at a weld point. As a result of this adaptation of the desired current value $I_{ca}$, an improvement is obtained compared with the conventional regulation system (from one period to the next). FIG. 6 shows an example of this inventive adaptive regulation.

The actual current $I_1$ during the first unregulated period p1 is under the fixed predetermined desired value $I_c$ as explained hereinbefore in connection with the prior art. Initially the currents $I_2$ and $I_3$ are identical during the periods p2 and p3, but are above the predetermined desired value $I_c$, in order in this way to compensate the intensity loss as a result of the weakness of the intensity $I_1$ during the period p1, the processor 27 initially attempting to distribute this weakness over the still remaining period p2 to p6.

If for example, as a result of a voltage drop, because possibly another welding machines is carrying out welding operations, during the period p4 the actual current $I_4$ drops, then this drop is compensated during the following periods p5 and p6 in addition to the intensity deficiency during the period p1, so that the total current during the periods p5 and p6 is not only higher than the predetermined desired value $I_c$, but also higher than the current $I_2$, $I_3$. In the known instantaneous regulation, the current for the periods p2, p3, p5, p6 was only regulated to the fixed predetermined desired value $I_c$, so that it was not possible to compensate intensity deficiencies of the periods $I_1$, $I_4$. This is made possible with the desired value adaptation according to the invention and, consequently, it is possible to raise the current during the period p2, p3, p5, p6 in the discussed manner to above the fixed predetermined desired value $I_c$. Thus, as a result of the invention, the average r.m.s. current corresponds to the predetermined desired value over all the periods and, consequently, the total current intensity over the welding operation has the desired value, so that the quality of the weld meets the requirements. In addition, an alarm device 28 is provided for the case that, for example, due to a voltage drop to zero, excessive intensity losses occur in the welding current, which can no longer be compensated by the intensity regulation by phase displacement.

In addition, according to the preferred inventive process, if the overall production system in which the welding machine is located allows a variation in the welding time, the number of welding periods for setting a weld point are varied, so that for example, in a subsidiary manner, the intensity regulation such extreme variations can be compensated by a time regulation. This more particularly occurs for example, an intensity drop during the last welding period can no longer be compensated by the intensity regulating means. The time or period regulation can also be used for minimizing the intensity variation between one a.c. voltage period and the next, in that the compensation of a major fault takes place over a longer period of time. Here again the adaptation processor 27 redefines the desired average r.m.s. current value in such a way that the energy product $rI^2t$ remains identical to that for the welding operation. If a fault leads to a considerable current excess, then optionally individual periods can be suppressed and once again the desired value is adapted to the average r.m.s. current, so that the energy product $rI^2t$ is retained throughout the welding operation.

We claim:

1. Process for welding by alternating current, the process comprising the steps of:
   measuring an actual r.m.s. welding current during a welding period,
   regulating a phase displacement of a start of the current flow during a subsequent a.c. voltage period, and
   comparing variations of actual r.m.s. welding current during all welding periods carried out with a desired r.m.s. current during the welding periods still to be carried out.

2. Process according to claim 1, further comprising the step of adapting the desired r.m.s. current for the regulation of the phase displacement in dependence upon the variations.

3. Process according to one of claims 1 or 2, further comprising the step of suppresing at least one of excessive current intensities and control variations.

4. Process according to one of claims 1 or 2, further comprising the step of providing an alarm signal if at the end of a welding operation the variation of the actual average r.m.s. current and a desired value of a total r.m.s. current is excessive.

5. Process according to one of claims 1 or 2, further comprising the step of providing an immediate alarm signal upon an occurrence of a fault and upon a determination that a correction will not bring about predetermined tolerances for an average r.m.s. welding current.

6. Process according to one of claims 1 or 2, wherein, upon an occurrence of major faults, the process further comprises the steps of modifying a number of welding periods to be carried out during the a.c. voltage periods, and redetermining an average r.m.s. current for each welding period so that a total welding energy for a welding operation is maintained even with a variable number of welding periods.

7. Welding apparatus for welding by alternating current, the welding apparatus comprising:
two welding electrodes,
a power supply for the welding electrodes,
means for regulating an effective welding current during each alternating current voltage period, and
computer means for taking into account variations of an actual r.m.s. welding current during preceding welding periods of a welding operation and comparing the variations with a desired effective welding current flow during the further welding periods to be carried out for a particular welding operation so as to enable a distribution of a desired effective welding current over the entire welding operation.

8. Apparatus according to claim 7, further comprising safety means for avoiding at least one of excessive current intensities and control variations.

9. Apparatus according to one of claims 7 or 8, further comprising alarm means for emitting an alarm signal if, at an end of a welding operation, the variation of the actual r.m.s. current compared with a desired total current flow is excessive.

10. Apparatus according to one of claims 7 or 8, further comprising an immediate alarm means for emitting an alarm upon an occurrence of a major fault so as to enable said computer means to determine corrections which can be carried out within predetermined tolerances for a desired average total r.m.s. welding current.

11. Apparatus according to one of claims 7 or 8, further comprising means for modifying a number of welding periods during a welding operation compared with a predetermined number of welding periods and for redefining an average desired r.m.s. current for each period, whereby a desired total energy flow during a welding operation even with a varying number of welding periods can be obtained.

* * * * *